United States Patent [19]

Wever et al.

[11] 4,300,024
[45] Nov. 10, 1981

[54] TECHNIQUE FOR MEASURING A DURATION OF SIGNALING PULSES IN A TELEPHONE CIRCUIT

[75] Inventors: Ruben Wever, San Jose; Daniel C. Moyles, Saratoga, both of Calif.

[73] Assignee: Wiltron Company, Mountain View, Calif.

[21] Appl. No.: 120,690

[22] Filed: Feb. 11, 1980

[51] Int. Cl.³ .............................................. H04M 3/22
[52] U.S. Cl. ..................... 179/175.2 A; 178/69 A; 179/16 EA
[58] Field of Search ......... 179/175.2 A, 16 E, 16 EA, 179/175.2 R, 175.1 R; 178/69 A, 69 R; 328/162–164, 111, 112

[56] References Cited

U.S. PATENT DOCUMENTS

| | | | |
|---|---|---|---|
| 3,502,983 | 3/1970 | Ingle et al. | 178/69 A |
| 3,550,021 | 12/1970 | Freeny | 178/69 A |
| 3,710,253 | 1/1973 | O'Neill | 178/69 A |
| 3,935,392 | 1/1976 | Smith et al. | 179/16 EA |

OTHER PUBLICATIONS

Western Elec. Maintenance Manual; Model 4A Signaling Test Set; CD-IC244-01; Issue 2A-Section II-Undated, pp. 1, 21–22 and drawing.

*Primary Examiner*—Thomas A. Robinson
*Attorney, Agent, or Firm*—Limbach, Limbach & Sutton

[57] ABSTRACT

A measurement method and apparatus for determining the duration of a current signaling pulse in a telephone circuit, without breaking or interrupting the circuit, through observing a voltage waveform across the circuit, even though the voltage waveform is distorted by characteristics of the circuit and components attached to it. According to one embodiment, the derivative of the voltage pulse is electronically taken to identify the leading and trailing edges of the current pulse, a pedestal voltage added to it and then its transitions sensed. According to another embodiment, a high impedance technique is utilized which does not impair service along the communication circuit being measured, this technique sensing transitions of the voltage waveform and processing the signal to avoid the effects of any zero crossings that occur during the pulse as a result of high amplitude ringing or relay contact bounce.

10 Claims, 5 Drawing Figures

TECHNIQUE FOR MEASURING A DURATION OF SIGNALING PULSES IN A TELEPHONE CIRCUIT

BACKGROUND OF THE INVENTION

This invention relates generally to techniques for making measurements along telephone circuits and, more specifically to techniques for making such measurements in order to determine the effects of a telephone circuit on dial pulse signals.

In communication networks, it is necessary to establish connection between two different points and this is usually done through an addressing system. In the typical telephone system, dial pulses or dial tones are used to signal to the nearest telephone office a request for connection of the initiating telephone to the address indicated by the number and configuration of pulses or tones. This address information must be passed on (repeated) to the next involved central office until the connection to the addressed telephone is established.

Monitoring and measuring the performance of this addressing portion of the telephone system is important. Many instruments exist for making measurements on telephone lines that utilize the dial-pulse method of signaling. To obtain accurate measurements, most of the available instruments require breaking the circuit and terminating it with the measuring instrument. One of the parameters these instruments generally attempt to measure is the percent break of the pulsing device. However, many of these instruments cannot accurately measure percent break when the pulse waveform is distorted by the characteristics of the measured circuit. A number of features not found in these instruments would be very desirable to improve the usefulness of the measuring equipment. One feature is to be able to make measurements of the dial characteristics without having to break the circuit. Another feature enables the instrument to perform a measurement on the circuit itself without modifying dial pulse characteristics of the circuit. Another very desirable characteristic is to be able to bridge across the circuit and obtain measurements not only at specific points, but virtually at any point along the circuit wherever access could be obtained. Yet another desireable characteristic is the ability to accurately measure the percent break of the pulsing device despite the presence of substantial amounts of inductance and capacitance in the measured circuit. It is a principal object of the present invention to provide a method and apparatus for making dial pulse signaling circuit measurements with these features and characteristics.

One commercially available technique that has some of these desirable characteristics provides a circuit that processes the voltage pulse by compression and delay in a complex circuit. It is another object of the present invention to provide a circuit with all of the above desirable characteristics that is simple, inexpensive and easy to use.

SUMMARY OF THE INVENTION

These and additional objects are accomplished by the present invention wherein, briefly, the characteristics of a detected voltage pulse that are distorted by the telephone circuit and relay impedance connected thereto are utilized to determine the duration of the current dialing pulse in the circuit. It is the duration of this pulse relative to the known duration of the pulse inserted into the circuit at some distant point that provides the measure of the telephone circuit that is desired.

According to one embodiment of the present invention (FIGS. 2 and 3 hereafter) the derivative of the detected voltage pulse is taken, a pedestal voltage added to the derivative signal and the transitions of the pulse detected. According to a second embodiment of the invention (FIGS. 4 and 5 hereinafter) a high impedance technique is provided by digitally processing the voltage pulse to detect its desired transitions while ignoring any distorted transitions of the voltage pulse caused by ringing or relay chatter and the like.

Additional objects, advantages and features of the various aspects of the present invention will become apparent from the following detailed description of its preferred embodiments, which description should be taken in conjunction with the accompanying drawings.

DESCRIPTION OF THE PREFERRED EMBODIMENTS

Figure 1:
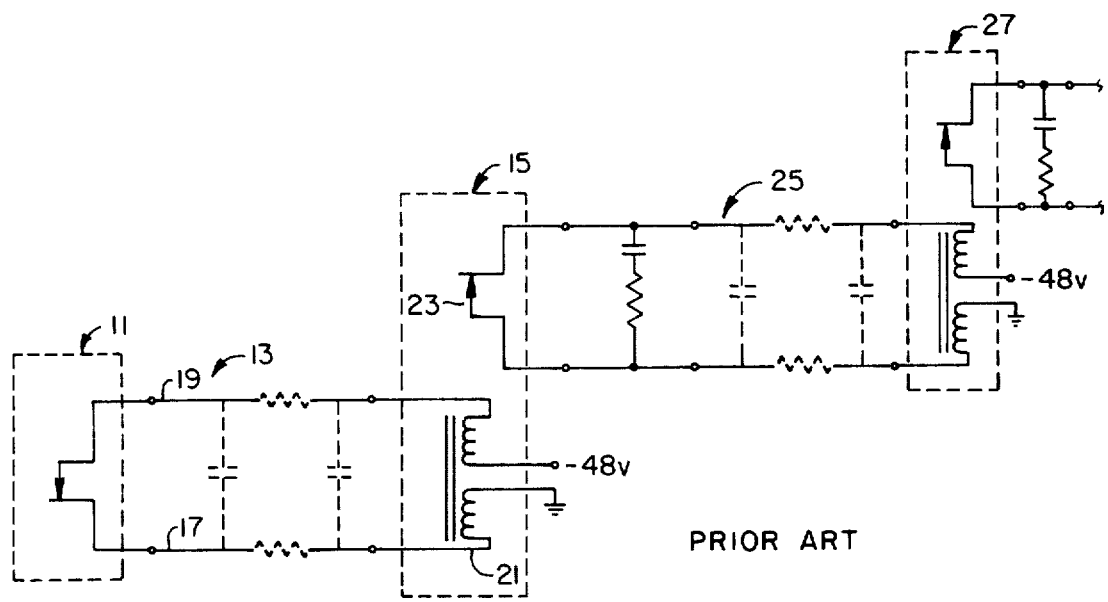
FIG. 1 schematically illustrates a repeating dial pulse signaling telephone circuit in which the existing invention is designed to operate.

Referring initially to FIG. 1, a dial pulse type of signaling telephone circuit is generally illustrated. At one central office is a pair of dialing contacts 11 that is connected through one telephone circuit 13 to a relay 15 in another office. The telephone line 13 includes a tip conductor 17 and a ring conductor 19, these two conductors of the telephone circuit being alternately shorted and opened by the contacts 11 according to the pulse code of the remote location desired to be addressed. The circuit 13 has inherent capacitance and resistance as shown in dotted outline.

The end of the circuit 13 opposite the dialing contact 11 terminates in a relay coil 21 that is part of the relay 15. Energization of the coil 21 causes relay contacts 23 to appropriately open or close. The pulse dialing signal initiated by the contacts 11 are thus transmitted into another telephone circuit 25 by the contacts 23. The dial pulses are communicated along the line 25 to another relay 27 located at a different central office, and so forth. Each of the relay coils, such as coil 21, is composed of two separate coils, each coil being connected at one end to one conductor of the telephone circuit 13, the other end of one coil being connected to ground potential and the other end of the other coil being connected to a minus supply voltage. This inductance permits the communication of voice frequencies along the telephone circuit simultaneously with the low impedance direct current dial pulses.

Figure 3:
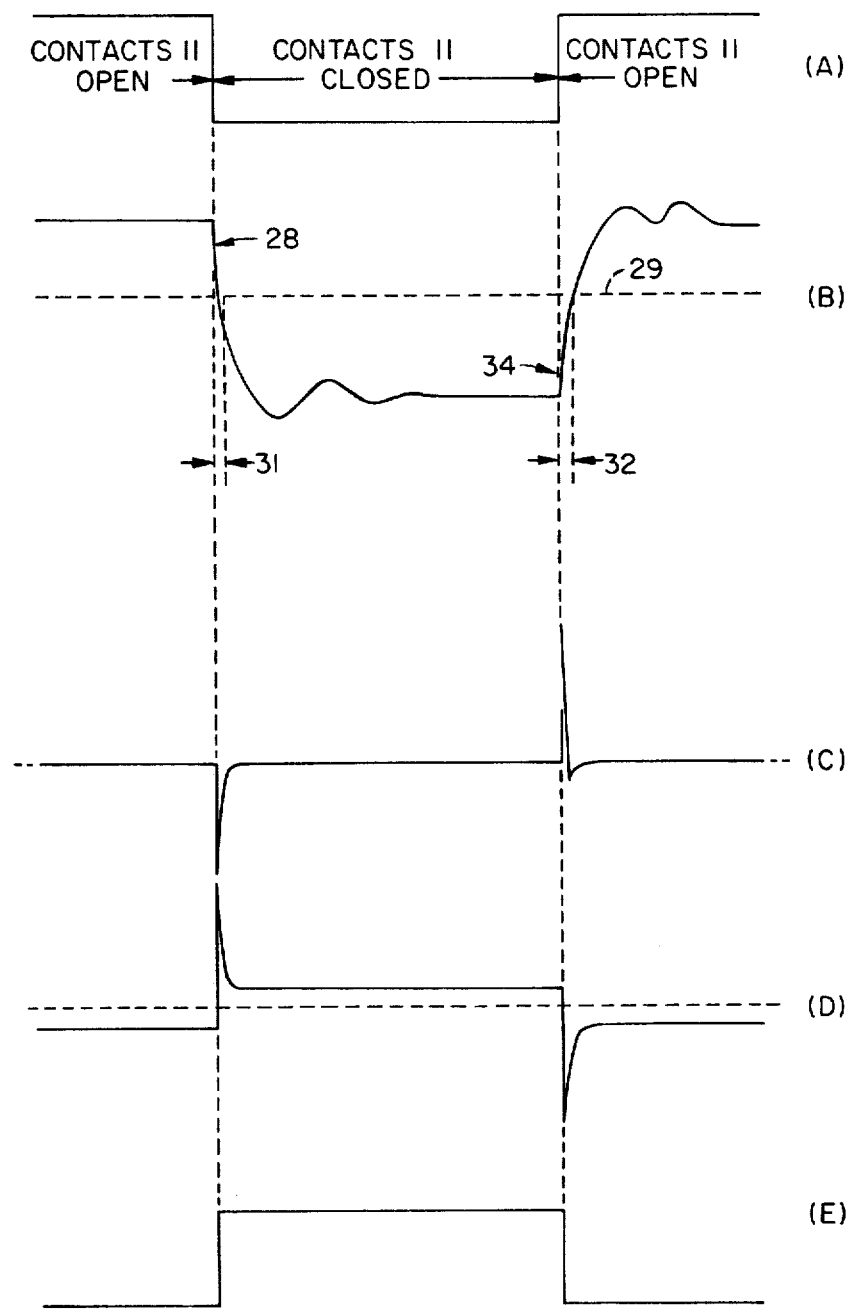
FIG. 3 shows voltage waveforms at various points in the circuit embodiment of FIG. 2.

Because of these inductances connected to the circuit 13 and because of the capacity of impedance inherent in the circuit itself, a negative current pulse sent along the line 13 by closing the contacts 11 generates distorted voltage pulses that are detected by reading the voltage across the lines 17 and 19. The amount of distortion depends upon where along the telephone circuit 13 or 25 a voltage measurement is taken. It is desirable to be able to determine the duration of the pulse injected at position 11 into the circuit at any point along the circuit 13, without breaking the circuit. Referring to FIG. 3A, such a negative dialing pulse is shown while FIG. 3B indicates a typical voltage waveform across the two conductors of a telephone circuit when measured with a relatively low impedance device. It can be seen from FIG. 3B that the distortion imparted by the telephone circuit impedance on the pulse distorts the leading and trailing edges of the voltage waveform of FIG. 3B. Therefore, to sense the duration of the current pulse by detecting a voltage at a threshold 29, for example, the duration detected will be greater than the duration of the current pulse of FIG. 3A by an amount 31 and 32, as shown in FIG. 3B. This error results from the leading and trailing edges of the voltage pulse of FIG. 3B having a slower rise time than the pulse injected at the contacts 11.

Figure 2:
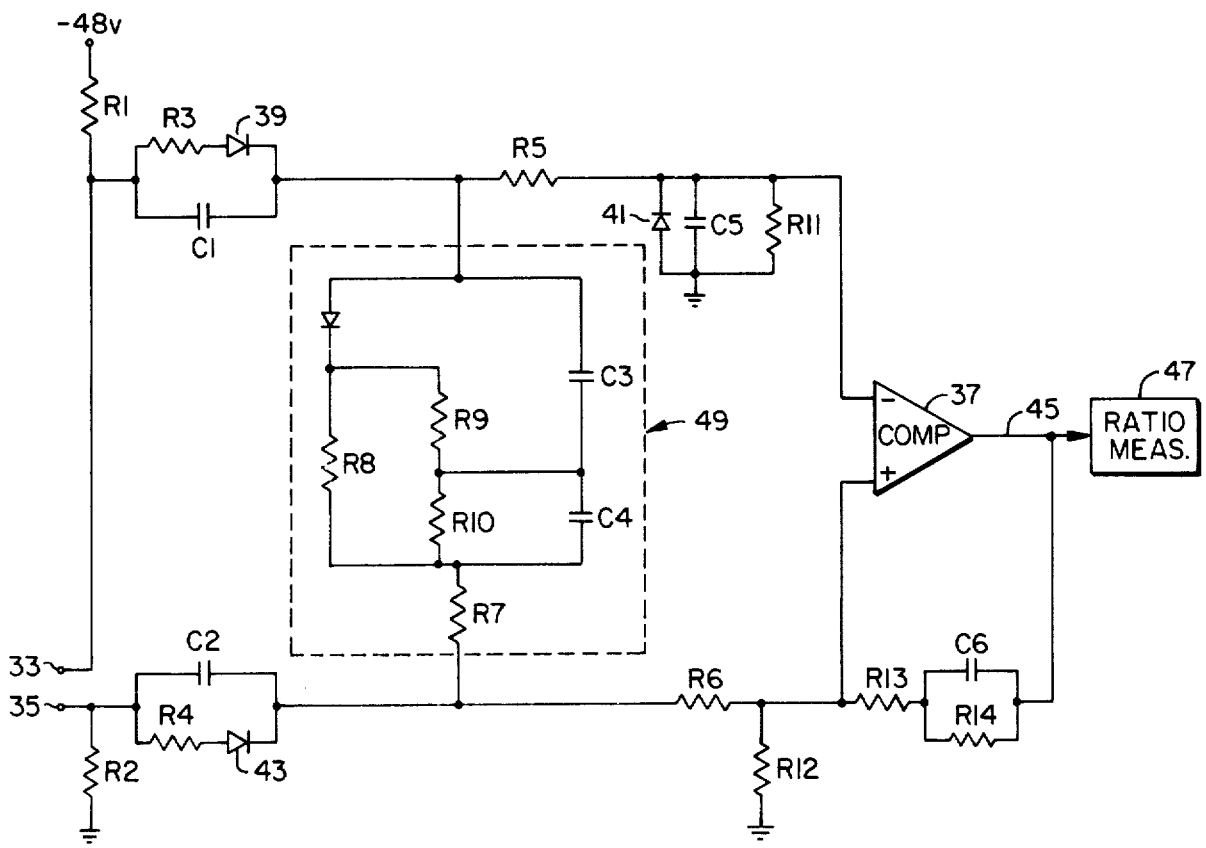
FIG. 2 is a schematic diagram of a pulse duration measuring instrument according to one embodiment of the present invention.

One embodiment of the present invention is illustrated in FIG. 2 wherein input terminals 33 and 35 are adapted for connection across a telephone circuit under test, such as being connected to the conductors 19 and 17, respectively, of FIG. 1. The distorted voltage waveform of FIG. 3B is thus impressed across the terminals 33 and 35. In doing the measurement, the terminal 33 is connected to a negative voltage source through a resistor R1 and the terminal 35 is connected to ground potential through a resistor R2. In this embodiment, each of these resistances is relatively low, less than 1,000 ohms, in order to contribute to and become a part of the telephone circuit pulsing system.

This low impedance approach has an advantage of dampening the magnitude of the ringing in the voltage waveform of FIG. 3B. The low impedance approach of FIG. 2 also has some effects on the performance of the telephone circuit while it is connected to that circuit but the measurements are performed without having to break into the circuit.

Each of the terminals 33 and 35 is connected to a circuit that takes the derivative of the pulse applied. A series circuit of capacitors C1, resistor R5 and resistor R11 are connected between the terminal 33 and ground potential. A derivative signal obtained at the junction of the resistors R5 and R11 (a voltage divider) is applied to an inverting input of a comparator 37. The voltage waveform applied at that input is shown in FIG. 3C. A series circuit of resistor R3 and a diode 39 are provided in parallel with capacitance C1 in order to provide a controlled discharge path for the capacitor. A diode 41 is connected between the junction of resistances R5 and R11 and ground potential as a clamping device. Capacitance C5 connected between the same two points as the diode 41 is provided for noise filtering.

Similarly, a series circuit of capacitance C2, resistance R6 and resistance R12 are connected between the terminal 35 and ground potential to take a derivative of the incoming pulse. A series combination of resistance R4 and diode 43 are connected across the capacitance C2 to provide a controlled discharge path. The junction between the series resistances R6 and R12 is connected to a non-inverting input of the comparator 37. An output 45 of the comparator 37 is fed back to its non-inverting input through a feedback circuit of R13 in series with a parallel circuit of R14 and C6. The result is the application to the non-inverting input of the comparator 37 of a derivative signal with a pedestal added as shown in FIG. 3D. This is a standard hysteresis technique. The input signals to the comparator are thus compared (the waveforms of FIGS. 3C and 3D), the output 45 going strongly positive whenever positive pulses appear in FIG. 3D, and strongly negative when the pulses are negative. The waveforms of 3C facilitate this transition. Positive feedback provides hysteresis insuring that the output 45 remains positive or negative until the input waveform is of sufficient magnitude to initiate a transition. Because the pulses of 3C and 3D are generated by taking the derivative of 3B, the transition of the comparator output occurs at points 28 and 34, the error indicated by 31 and 32 is thus avoided, and the duration of 3A can be accurately measured. The pulse of FIG. 3E, being processed from the voltage pulse across the line of FIG. 3B, corresponds in duration to that of the current pulse of FIG. 3A. This is the desired quantity to be measured. In the circuit of FIG. 2, this pulse duration is applied to a circuit 47 which measures the ratio of pulse duration to a complete pulse period, a quantity used in testing pulsing characteristics of telephone circuits.

A complex load 49 is also provided as part of the circuit of FIG. 2 which is matched in impedance to the characteristic of the relays used on the telephone circuit under test. This high impedance load improves the performance of the comparator.

Figure 4:
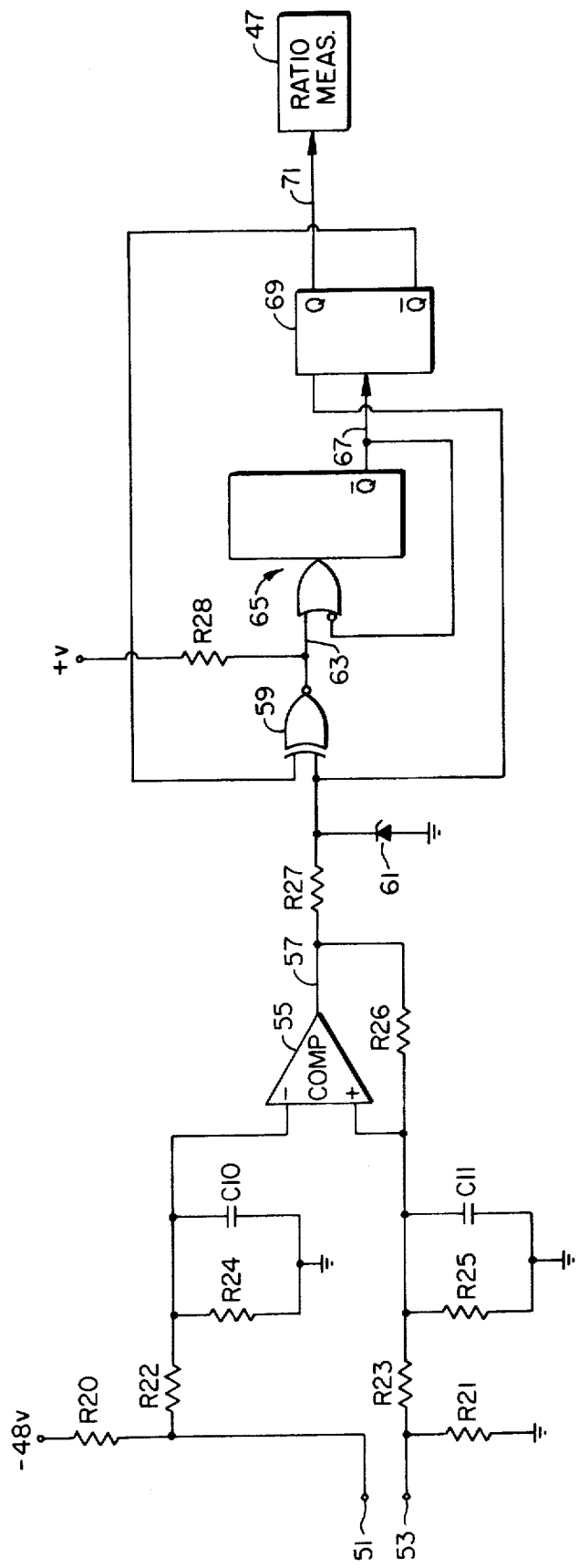
FIG. 4 is a schematic diagram of a measuring instrument according to another embodiment of the present invention.
Figure 5:
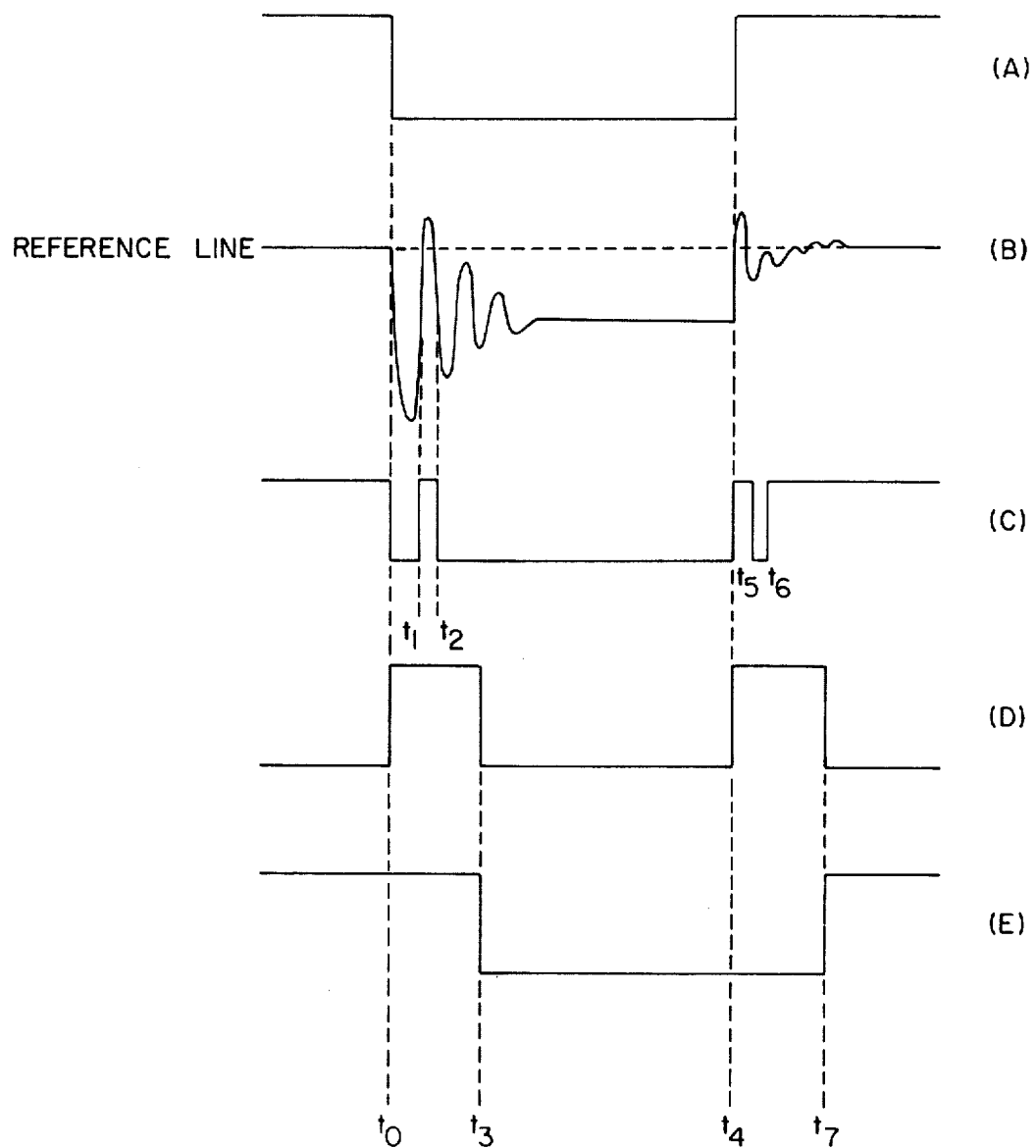
FIG. 5 is voltage waveforms at various points in the circuit embodiment of FIG. 4.

Referring to FIG. 4, another embodiment of the present invention will be described. A pair of input terminals 51 and 53 are provided for connecting across the two conductors of a telephone circuit at any convenient place along that circuit. The terminal 51 is adapted for connecting to the ring conductor of the telephone circuit, and is connected through a resistance R20 to a standard telephone negative voltage supply. Similarly, the terminal 53, adapted for connecting to the tip conductor of the telephone circuit under test, is connected to ground potential through a resistance R21. Distinct from the input arrangement described with respect to FIG. 2, the resistances R20 and R21 of the embodiment of FIG. 4 are made to be in excess of 5,000 ohms each so that the circuit of FIG. 4 does not load down the telephone circuit under test. Use of the circuit of FIG. 4 has a further advantage of not significantly affecting the pulse signaling characteristics of the circuit even while it is being tested. The result of a high impedance circuit receiving the voltage pulse from the telephone circuit that it has a high amplitude of ringing in the early part of the voltage pulse, as shown in FIG. 5B. FIG. 5A is the input current pulse to the telephone circuit whose duration is desired to be determined by the circuit of FIG. 4.

The circuit of FIG. 4 utilizes a comparator 55. An inverting input of the comparator 55 is connected through a resistance R22 to the input terminal 51. A parallel circuit of R24 and C10 are connected between ground potential and the inverting input as well. The components R22, R24 and C10 serve primarily as an attenuation circuit. A similar circuit is provided between the terminal 53 and the non-inverting input of the comparator 55, this being formed of the series resistance R23 and of the parallel combination of R25 and C11. A resistance R26 is connected between an output 57 of the comparator 55 and its non-inverting input.

The portion of the FIG. 4 circuit described so far produces substantially the uniform magnitude pulses that have duration so long as the voltage signal applied to the terminals 51 and 53 (as shown in FIG. 5B) is below the reference line. Thus, at time t0 a pulse in FIG. 5C is commenced, the trailing edge of that pulse occurring at time t1 when the high magnitude ringing of the voltage waveform of FIG. 5B causes that voltage to go above the reference line. When the voltage of FIG. 5B goes below the reference line at time t2, a second pulse is commenced at the point 57, as shown in FIG. 5C. At the end of the voltage pulse, at time t4, the voltage at the output 57 returns positive again as shown in FIG. 5C. The purpose of the remaining portion of the circuit of FIG. 4 is to compensate for the ringing of the input voltage pulse so that the uninterrupted duration of the initiating current pulse can be determined.

The pulses of FIG. 5C at the output 57 of the comparator of FIG. 4 are applied through a series resistance R27 to one input of an exclusive OR gate 59. A Zener diode 61 is connected between that input to the OR gate 59 and ground potential, serving as a voltage limiter. An output 63 of the OR gate 59 is connected to a supply voltage through a resistance R28 and also connected to one input of a mono-stable multivibrator 65. An output 67 of the multi-vibrator 65 emits, when triggered, a pulse of a fixed duration, shown in FIG. 5D. This duration is made to be long enough to exceed the time that the voltage pulse of FIG. 5B is likely to drop below zero voltage because of the ringing. This then eliminates the effect of the ringing. That duration as chosen in a specific embodiment for usual telephone line applications to be 25 milliseconds or greater, but certainly only a fraction of the duration of the pulse from t0 to t4 that is desired to be measured. This technique also eliminates the effect of relay chatter that occurs in the first and last five milliseconds or so of the voltage pulse.

The fixed duration pulses in the line 67 serve as a clock for a flip-flop circuit 69 which has an output 71 giving a pulse shown in FIG. 5E whose duration is the same as the duration of the current pulse of FIG. 5A that is desired to be measured.

The circuit shown in FIG. 4 causes the multivibrator 65 to trigger an output pulse of the fixed duration at the occurrence of either a leading or trailing edge of the pulse output of the comparator 55 (FIG. 5C). The output 71 (FIG. 5E) goes low at time t3 which is the trailing edge of the multi-vibrator output pulse of FIG. 5D. It goes low because at that time the pulse of FIG. 5C is also low. At time t7, the trailing edge of the next multivibrator output pulse, the level in the line 71 (FIG. 5E) goes high because at that instant the waveform of FIG. 5C is high. The multi-vibrator is inhibited from re-triggering during this fixed duration and thus does not respond to the edges at t1, t2, t5 and t6. The result is a pulse whose duration is the desired quantity to be measured, having been obtained without disturbing the pulse signaling characteristics of the telephone circuit under test.

In a very specific implementation of the circuits described herein, the following resistance and capacitance values are utilized in the circuit of FIG. 2:

| | |
|---|---|
| R1—200 ohms | R11—215k ohms |
| R2—200 ohms | R12—90.9k ohms |
| R3—261k ohms | R13—75k ohms |
| R4—261k ohms | R14—1M ohm |
| R5—110k ohms | C1—0.002 microfarad |
| R6—110k ohms | C2—0.002 microfarad |
| R7—484k ohms | C3—0.01 microfarad |
| R8—100k ohms | C4—0.002 microfarad |

-continued

| | |
|---|---|
| R9—261k ohms | C5—0.001 microfarad |
| R10—484k ohms | C6—0.01 microfarad |

Similarly, the component values for the circuit of FIG. 4 are as follows:

| | |
|---|---|
| R20—10k ohms | R26—820k ohms |
| R21—10k ohms | R27—1.47k ohms |
| R22—100k ohms | R28—1.0k ohms |
| R23—100k ohms | C10—0.001 microfarad |
| R24—2.61k ohms | C11—0.001 microfarad |
| R25—16.2k ohms | |

Although the various aspects of the present invention have been described with respect to its preferred embodiments, it will be understood that the invention is entitled to protection within the full scope of the appended claims.

We claim:

1. A method of measuring the duration of a current pulse in a telephone circuit without interrupting circuit continuity, wherein said telephone circuit causes a voltage waveform detected thereacross to be a distorted representation of said current pulse, said method comprising the steps of:
    detecting a voltage pulse waveform at a desired location along said telephone circuit without interrupting the circuit,
    obtaining a derivative of said voltage pulse waveform, whereby opposite polarity voltage spikes are generated at the beginning and end of the current pulse,
    moving the voltage level existing between said opposite polarity voltage spikes to a non-zero level, thereby forming a modified derivative of the voltage pulse, and
    detecting the duration between zero crossings of said modified derivative of the voltage pulse, thereby to determine the duration of said current pulse.

2. The method according to claim 1 wherein said step of detecting a voltage pulse includes the step of obtaining the voltage waveform by an electrical connection directly to the tip and ring conductors of the circuit at said desired location and further connecting the ring conductor through a first resistance to a negative voltage supply and said tip conductor through a second resistance to ground potential, each of said first and second resistances being less than 1,000 ohms.

3. The method according to claim 1 wherein the step of moving the voltage level includes deriving the magnitude of such movement from the voltage detected at said desired location.

4. A method of measuring the duration of a current pulse in a telephone circuit without interrupting circuit continuity, wherein said telephone circuit causes a voltage waveform detected thereacross to be a distorted representation of said current pulse, said method comprising the steps of:
    detecting a voltage pulse waveform at a desired location along the circuit without altering the pulse transmission characteristics of the circuit to any significant extent, whereby a voltage pulse detected can include large magnitude ringing that crosses a reference line near the beginning of the pulse, forming a first pulse of a substantially uniform magnitude each time and for a duration that said voltage pulse waveform is in excess of said reference line, generating a second pulse of a fixed duration that is initiated at each leading edge of said first pulse, said fixed duration being selected to exceed the time that said voltage pulse ringing crosses the reference line at the beginning of the pulse, and generating a third pulse from a combination of said first and second pulses in a manner that the duration of the third pulse is that of the first pulse with any interruption therein caused by the voltage pulse waveform going across the reference line during the pulse being eliminated.

5. The method according to claim 4 wherein the duration of said second pulse exceeds 25 milliseconds.

6. The method according to claim 4 wherein said detecting step includes obtaining the voltage waveform by an electronic connection directly to the tip and ring conductors of the telephone circuit at said desired location and further includes connecting the ring conductor through a first resistance to a negative voltage supply and said tip conductor through a second resistance to ground potential, each of said first and second resistances being greater than 5,000 ohms, whereby the attachment of the circuits to the telephone minimizes any effect thereof on the ability of the circuit to communicate dial pulses.

7. Apparatus for measuring the duration of a current pulse in a telephone circuit without interrupting circuit continuity, comprising:

two input conductors adapted for connection to the tip and ring conductors of a telephone circuit under test, whereby the voltage across the telephone circuit at the points of connection is impressed across said terminals, separate means connected to each of said terminals for generating a signal that is a differential of a voltage signal impressed across said terminals, means receiving one of the differential signals for adding a bias level thereto, means receiving the other of the differential signals and the biased differential signal for comparing the magnitudes of the two signals and generating one signal level when the difference is greater than zero voltage and another signal level when the difference is less than a reference voltage other than zero volts, whereby the resulting two level signal is a pulse having a duration equal to that of a current pulse in a telephone circuit under test even though the circuit characteristics distort the voltage pulse that is impressed across said input conductors.

8. The apparatus according to claim 7 wherein said differential signal generating means includes a resistance-capacitance component network.

9. The apparatus according to claim 7 wherein said bias level adding means includes means responsive to the voltage across said two input conductors for establishing said bias level.

10. A system for measuring the duration of a current pulse in a telephone circuit without interrupting circuit continuity, comprising:

two input conductors adapted for connection to the tip and ring conductors of a telephone circuit under test, whereby the voltage across the telephone circuit at the points of connection is impressed across said terminals, means connected to receive the voltage signal across said two terminals for generating substantially uniform magnitude pulses that exist coextensive in time with the duration that a voltage waveform impressed across said terminals exceeds zero, means responsive to said first pulses for generating second pulses of fixed time duration beginning at the leading and trailing edge of said first pulses, and means receiving both said first pulses and said second fixed duration pulses for generating a pulse extending in time between the trailing edges of said second pulses, the duration of said third pulse thus being equal to the desired current pulse duration in a telephone circuit under test.

* * * * *